March 18, 1969  D. EPPLER  3,433,275
STRAP APPLYING TOOL
Filed Aug. 11, 1965  Sheet 1 of 4
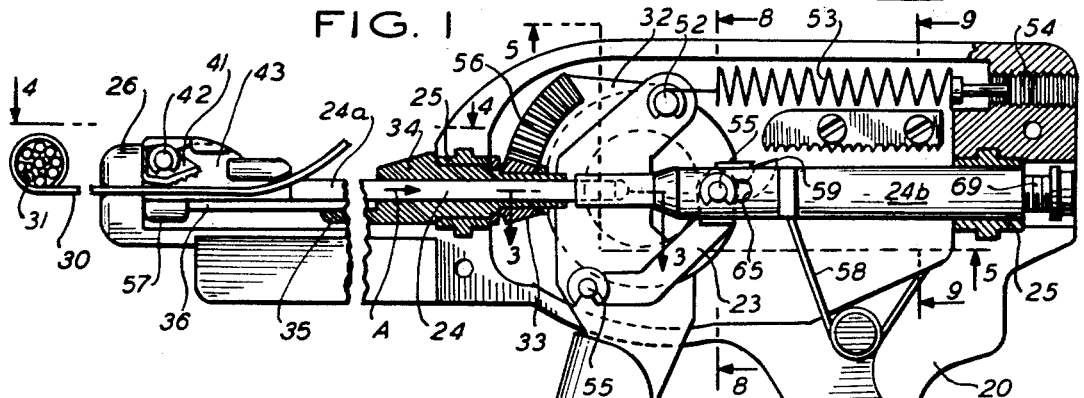
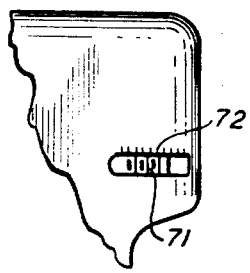
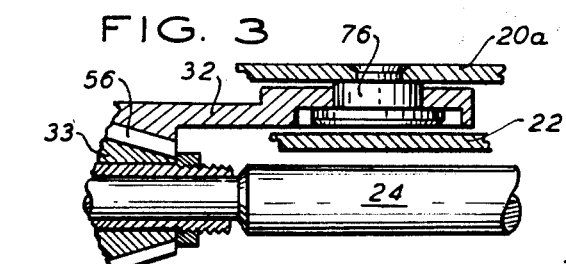
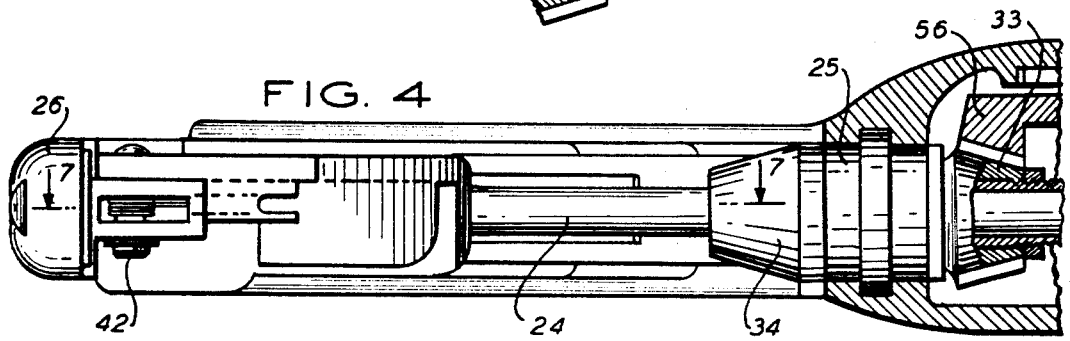
INVENTOR
DANIEL EPPLER
BY
ATTORNEY

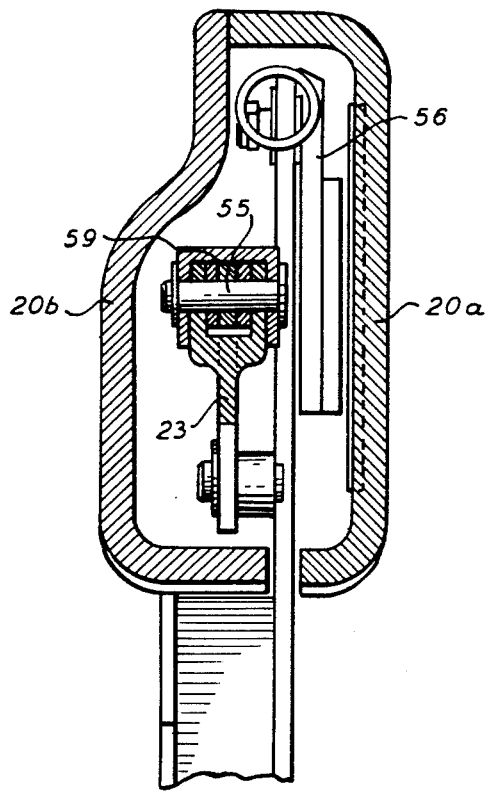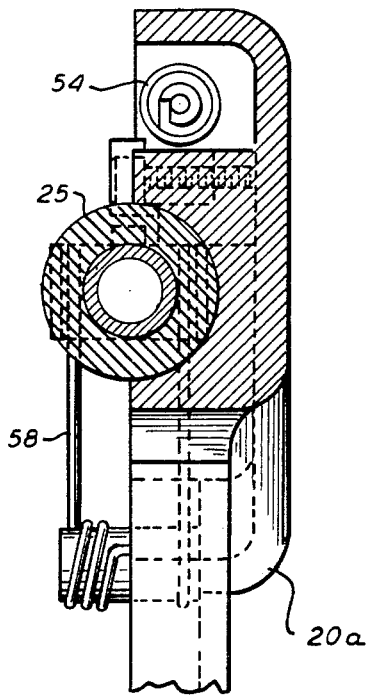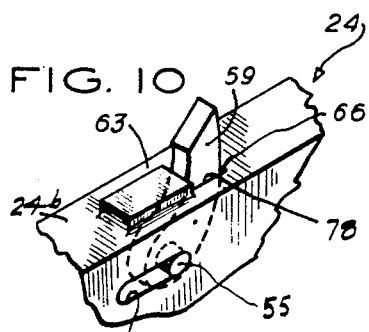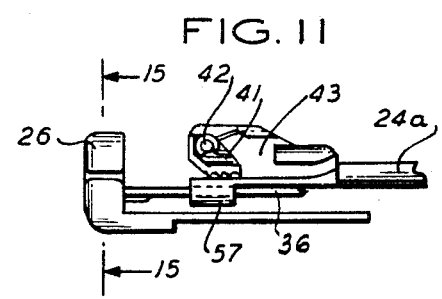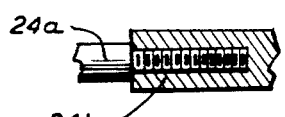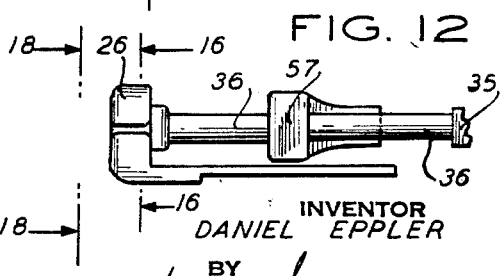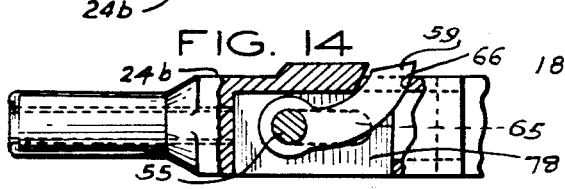

United States Patent Office 3,433,275
Patented Mar. 18, 1969

3,433,275
STRAP APPLYING TOOL
Daniel Eppler, Nutley, N.J., assignor to The Thomas & Betts Co., Inc., Elizabeth, N.J., a corporation of New Jersey
Filed Aug. 11, 1965, Ser. No. 479,349
U.S. Cl. 140—93.2          13 Claims
Int. Cl. B21f 9/02, 9/00, 45/16

ABSTRACT OF THE DISCLOSURE

A tool for applying a strap to a bundle of wires or the like is provided wherein the tool has means for drawing the end of the strap thereinto on actuation of a movable handle until a certain tension is applied to the strap, the tool then effecting twisting of an end portion of the strap end, if desired cutting the end off from the strap.

---

Figure 5:
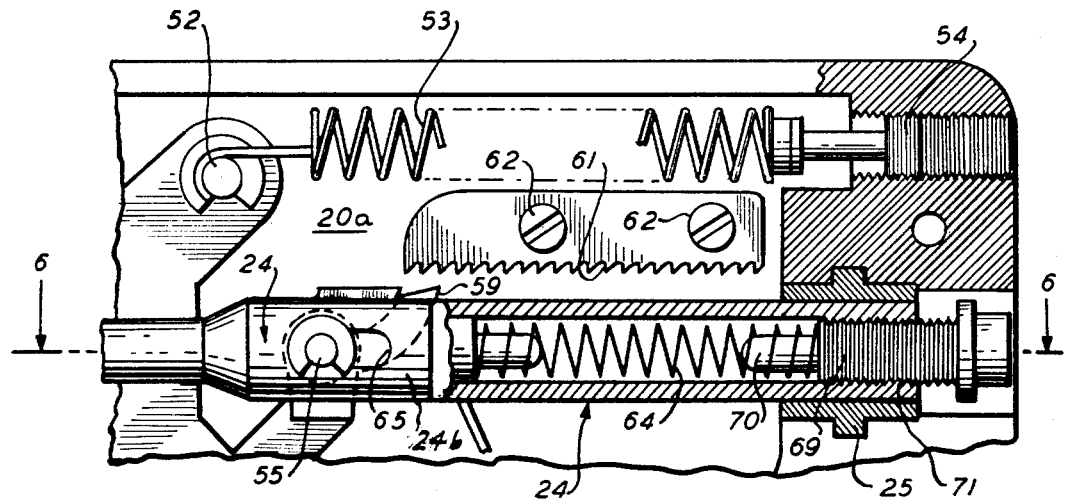

This invention relates to a tool for applying a strap to articles—for example (but without limitation) to compact and hold a group of wires or other articles.

The tool incorporates novel features of adjustability, including adaptability for use, with equal efficacy, in connection with straps of various sizes and contours. Thus, a strap of given length may be used for objects of varying bulk or dimensions.

Novel means are provided, as below set forth, for progressively axially advancing the strap into the tool to a predetermined point, and then arresting further movement of the strap.

A further feature of the invention is to provide such a tool wherein means are provided for rotating the strap, for cutting or other purposes, when the strap is positioned in the tool at a predetermined point.

A further feature of the invention is to provide novel tension means in the tool adjustable to predetermine the degree of tension under which the strap is to be wrapped about an article or group of articles and to then automatically arrest further tensioning of the strap.

A further feature of the invention is to provide novel means for pressing the strap against a cutting blade and effectuating a smooth cutting action.

The drawings, illustrating procedures and devices useful in carrying out the invention, and the description below, are exemplary only of the invention, which shall be deemed to cover all other devices and procedures coming within the scope and purview of the appended claims.

Figure 6:
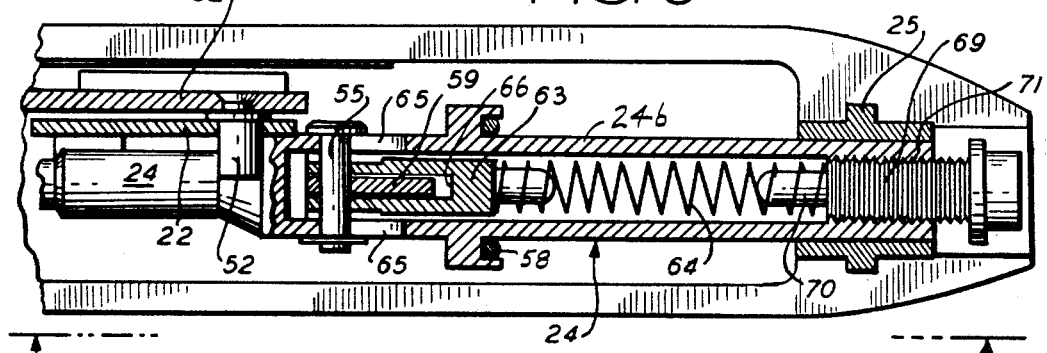
Figure 7:
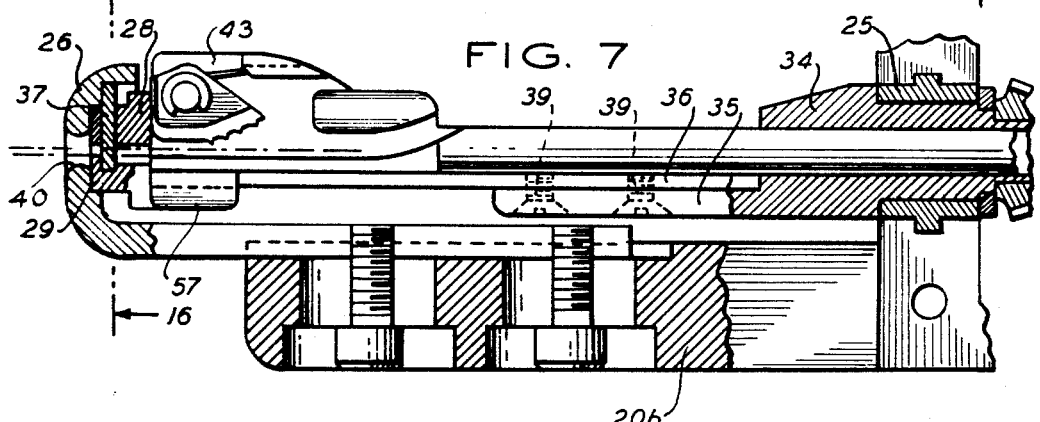
Figure 15:
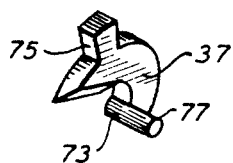
Figure 16:
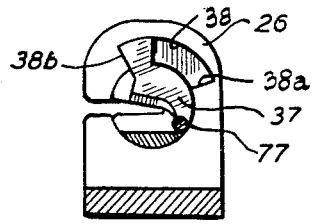
Figure 17:
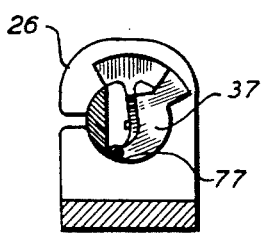
Figure 18:
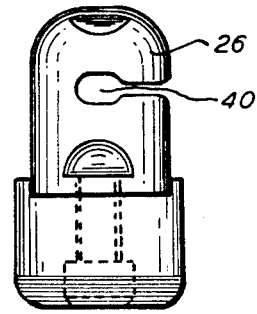
Figure 19:
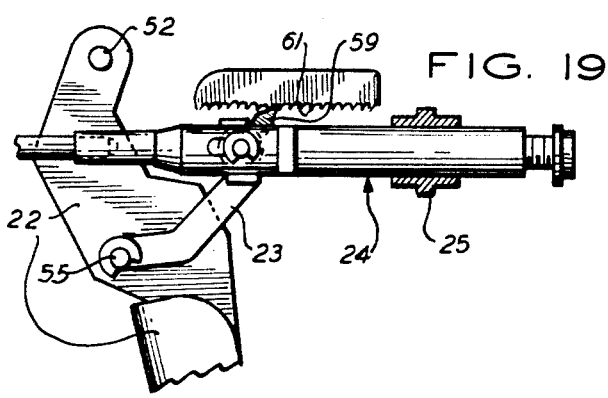
Figure 20:
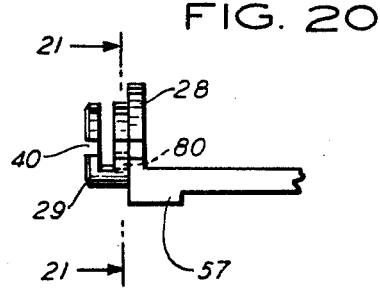
Figure 21:
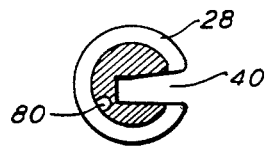

In the drawings, wherein similar reference characters indicate like parts:

FIG. 1 is a vertical elevational, partly sectional view of a tool embodying my invention, FIG. 2 is a fragmentary, sectional, elevational view of the upper right hand portion thereof (in the position of the parts shown in FIG. 1), FIG. 3 is an enlarged fragmentary, elevational view taken at line 3—3 of FIG. 1, FIG. 4 is an enlarged, horizontal, partly sectional view, taken at line 4—4 of FIG. 1, FIG. 5 is an enlarged elevational, partly sectional view, taken at line 5—5 of FIGS. 1 and 6, FIG. 6 is an enlarged horizontal, partly sectional view, taken at line 6—6 of FIG. 5, FIG. 7 is an enlarged vertical sectional view, taken at line 7—7 of FIG. 4, FIG. 8 is an enlarged vertical sectional view, taken at line 8—8 of FIG. 1, FIG. 9 is a similar view, taken at line 9—9 of FIG. 1, FIG. 10 is an enlarged fragmentary perspective view, illustrating a means for arresting further axial movement of a shaft at a predetermined tension point, FIG. 11 is a fragmentary schematic view of the shaft (24) and registration plate (26) and associated parts of the tool, FIG. 12 is a similar elevational view, showing the position of the parts with the shaft turned, FIG. 13 is a fragmentary sectional view of the shaft formed of interengaged threaded sections, FIG. 14 is a fragmentary sectional view of dog 59 and associated shaft parts, also shown in FIG. 10, FIG. 15 is a perspective view of a knife member which may be disposed at the registration end of the tool, FIG. 16 is a vertical elevational view of the registration plate end of the tool, taken at line 16—16 of FIG. 12, FIG. 17 is a similar view thereof, with the parts advanced to the position in which the strap is pressed against the blade, to cut the strap, FIG. 18 is a vertical elevational view of the registration plate end of the tool, taken at line 18—18 of FIG. 12, FIG. 19 is a fragmentary, schematic, elevational view of the movable handle and associated parts, also shown in FIG. 1, FIG. 20 is a fragmentary elevational view of the left hand end portion of the twister plate in the FIG. 7 position of the parts, and FIG. 21 is a vertical sectional view thereof, taken at line 21—21 of FIG. 20.

As shown in the drawings, the tool of this invention comprises a casing 20 which may be formed in any desired or convenient manner—for example, of sections 20a, 20b (FIG. 8) defining a hollow interior, one section having formed unitarily therewith or secured thereto, a fixed handle 21. A handle member 22 is (FIG. 1) positioned in the casing movably relative to fixed handle 21, as below described; shaft 24 is reciprocably disposed in bearings 25 in the casing and is connected to movable handle 22 as by link 23. A strap registration plate 26 (FIGS. 1 and 18) is secured to one end of casing 20, as by bolts (FIG. 7) a strap twister plate 28 (FIG. 7) having an aperture 40 for passage therethrough of the strap 30 is rotatably positioned in recess 29 in the registration plate 26. On operation of the tool, strap 30 (FIG. 1) is drawn into the tool to the predetermined point wherein resistance to movement with shaft 24 in the direction of the arrow A is encountered, for example, due to its final tightening position relative to an article, such as a bundle of wires 31 (FIG. 1). Thereupon further movement of the movable handle 22 relative to fixed handle 21 will actuate a gear member 32 for engagement of gear segment 56 thereof with a pinion or gear 33 (FIGS. 1 and 4), keyed to a tube 34 journalled in bearing 25; tube 34, in turn, serves as the bearing in which the shaft 24 freely reciprocates in operation, to tighten the strap to the predetermined tension point. The tube 34 has an extended plate portion 35 (FIG. 1) which may be secured by bolts 39 (FIG. 7) to an extended plate bar 36 integral with or otherwise secured to the strap twister plate 28 which extends therefrom.

The device is highly adaptable in use, the registration plate 26 and the strap twister plate 28 being readily replaceable and interchangeable to accommodate straps of different dimensions and contours. A cutter blade 37 is (FIG. 7) positioned slidably in the vertical recess in twister plate 28 portion of strap registration plate 26.

The tool of this invention is adapted for use in any application in which a strap is to be drawn, for example, in the direction of the arrow A (FIG. 1) around or applied to an article or articles, the free end of the strap 30 being initially inserted through opening 40 (FIG. 7) in registration plate 26, under a pawl 41, which is pivotally secured, as at 42, to upstanding wall 43 of shaft 24, the pawl 41 being normally urged downwardly by spring means or the like (FIG. 11). In the operation of the tool, the free end of the strap 30 is thus positioned through opening 40 in registration plate 26 and under pawl 41; then, on moving handle 22 toward fixed handle 21, shaft 24 will be reciprocated with reciprocation of handle 22 as noted at 51 in FIG. 1, thus progressively moving the strap into the tool. On release of handle 22 (due to return spring 58, engaging shaft 24 FIGS. 1 and 9) the shaft 24 will be returned to (FIG. 1) position against the registration plate 26; during said return movement the pawl 41 lifts and slides over the strap 30.

During the operation of drawing the strap into the tool, above described, the handle 22 will have reciprocated (51, FIG. 1) while pivoting on pivot pin 52 on the gear plate 32, which is held under tension by spring 53, adjustable as at 54. When the strap 30 has been moved into the tool to the predetermined tension point, further movement of shaft 24 in the direction of arrow A while handle 22 is pivoting on pivot pin 52 (FIG. 1) with movement of handle 22 will be resisted; and the handle 22 will then pivot on pin 55a.

Pursuant to this invention, movement of handle 22 toward handle 21 will result in pivoting of handle 22 on the axis of pin 55a (which is disposed at one end of link 23) as above noted. The other end of link 23 has passing therethrough pin 55, movable in slots 65 of shaft section 24b. Normally, pin 55, due to the pressure of one end of spring 64 (FIG. 6) against the bearing or frame 63 through which the pin 55 passes, is disposed in the forward end portion of slot 65 (FIG. 14). Movably mounted on the pin 55 within the frame 63 is a dog 59 normally disposed in retracted (FIG. 6) position when the frame 63 is pressed by spring 64 so that when the handle 22 is moved toward fixed handle 21 the energy expended will be exerted through link 23 and pin 55 and through spring 64 against the stud 69 (FIG. 6) and thus against the shaft 24 and will move the shaft 24. When, however, the strap 30 has been tightened around the article 31 to such extent that the shaft 24 essentially resists further axial movement, link 23 will move pin 55 toward the right hand end of slot 65, FIG. 10, while the shaft 24 so resists further axial movement. The dog 59 moves against the cam edge 66 (FIGS. 6 and 14) in the shaft section 24b and out of opening 78 in the frame 63 and into (FIG. 19) engagement rack 61, locking the shaft 24 against further axial movement, initiating the shaft turning or rotative cycle movement of shaft section 24a (FIG. 6) with tube 34, to effect cutting of the strap 30.

When handle 22 rotates about lower link pin 55a instead of pin 52, the upper end of handle 22, connected to gear plate 32 at 52, will move to the left (viewing the parts as in FIG. 1). The rack segment 56 will now mesh with and rotate gear or pinion 33, keyed or otherwise fixed to tube 34, rotating the tube. The tube 34, in turn, is fixed (FIG. 7) to the bar portion 36 as at 39.

The bar portion 36 of tube 34 (shown fragmentarily in FIG. 11) slidably engages ring or open bearing 57 depending from the bottom of the wall 43 of shaft 24; the bearing normally reciprocates on the bar 36. On rotation of tube 34 (on meshing of gears 33–56) the bar 36 and the strap twister plate portion 28 thereof (FIG. 7) are rotated. Shaft section 24a rotates therewith—due to connection 57. Strap 30, while twisted, presses the cutter blade 37 against the shouldered end 38a (FIG. 16) of recess 38 in strap registration plate 26. The strap is cut while so pressing against the cutter blade in essentially a smooth shears cutting action, which is very effective in operation (FIG. 17).

The offset, or pin portion 77 or end 73 (FIG. 15) of the cutter blade 37 is freely received in the aperture or recess 80 (FIG. 21) of the twister plate 28. As above noted, on rotation, twister plate 28 will engage strap 30 and cutter blade 37 and rotate them, the cutter blade 37 moving from the FIG. 16 to the FIG. 17 position and cutting the strap 30 by pressure against the cutter blade 37. Thus the cutter blade 37 is moved by the strap 30 and twister plate 28 from an initial (FIG. 16) position wherein the protuberance or stud end 75 thereof rests against an end 38b of recess 38 in strap registration plate 26 (in which recess the stud end 75 moves in operation) to the FIG. 17 position wherein the stud end 75 abuts the shouldered end 38a of recess 38 and is thus held against further rotation while the continued rotation of the twister plate 28 presses the strap 30 against the blade 37 and thus cuts the strap 30.

The shaft portion, 24b, is (FIG. 13) connected (as by threads) to shaft portion 24a, so that the latter may in the above described) strap cutting operations, rotate without hindrance from the (non-rotating) rear shaft portion 24b. The (front and rear) shaft sections (24a, 24b) are axially constantly connected (as by the threads) while relatively rotatable as above noted. The dog 59 normally rests by gravity in opening 78 of shaft section 24b and is thus normally out of contact with the rack 61 fixed to the interior of the tool casing 20.

As shown in FIG. 6, an adjusting stud 69 at one end, 70, engages the spring 64 and is threaded as at 71 in the shaft 24.

The degree of tightening of the spring 64 by stud 69 and of spring 53 by stud 54 (FIG. 1) thus enables the user to preset and predetermine the point at which the shaft will rotate to cut the strap 30. Such adjustment may be measured by a scale 72 (FIG. 2) marked on the tool casing for registration with the threads 71 or other indicia. Gear plate 32 may be journalled in section 20a of casing 20 by a pin 76 (FIG. 3) and, as above noted (FIGS. 1, 5), may be tensioned by spring 53 adjusted by stud 54 in casing 20.

While the foregoing disclosure of exemplary embodiments is made in accordance with the Patent Statutes, it is to be understood that the invention is not limited thereto or thereby, the inventive scope being defined in the appended claims:

I claim:

1. A strap applying tool comprising: a casing; a registration means at one end of said casing for entry of a strap into the tool; a shaft mounted in said casing for axial movement therein; said shaft having first and second portions; said first portion of said shaft capable of being rotated independently of said second portion of said shaft; first means coupled to said first portion of said shaft for engaging said strap for movement thereof with the axial movement of said shaft; a part coupled to said second portion of said shaft for axial movement with said shaft; second means upon said casing and engageable by said part to prevent further axial movement of said shaft; and third means upon said first portion of said shaft to cause rotation of said first portion of said shaft together with said first means, after further axial movement of said shaft is prevented to thereby twist the strap.

2. A strap applying tool as claimed in claim 1 in which said second means engageable by said part comprises a rack.

3. A strap applying tool as claimed in claim 2 in which the part coupled to said second portion of said shaft is a dog normally disposed in retracted position in said second portion of said shaft and projected from the shaft into engagement with the rack upon a predetermined resistance being encountered by the shaft in tightening the strap.

4. A strap applying tool comprising a casing, a registration plate at one end of said casing for entry of the strap in the tool, a shaft axially movably mounted in the casing, means on the shaft for engaging the strap for movement thereof with the shaft to thereby tighten the strap to a predetermined tension point, a dog movable with the axial movement of the shaft, said dog normally disposed in the retracted position in the shaft and projected from the shaft into engagement with a rack upon a predetermined resistance being encountered by the shaft in tightening the strap, a rack engageable by said dog to hold said shaft against axial movement and means for then rotating said strap engaging means, thereby twisting the strap, said tool further comprising a movable handle provided for effecting the axial movement of the shaft and for rotating the strap engaging means, said handle being provided with two pivots, the first being employed to effect the axial movement of the shaft and the effecting of the arresting of axial movement of the shaft, and the second pivot being employed for effecting rotative movement of the strap engaging means.

5. A strap applying tool comprising casing, a registration plate at one end of said casing for entry of the strap in the tool, a shaft axially movably mounted in the casing, means on the shaft for engaging the strap for movement thereof with the shaft to thereby tighten the strap to a predetermined tension point, a part movable with the axial movement of the shaft, means thereupon engaging the shaft and holding it against axial movement and for then rotating said strap engaging means, thereby twisting the strap, said tool further including complementary locking means on the shaft and on the casing for arresting axial movement of the shaft, said complementary locking means comprising a pin carrying one of the locking means movably positioned in the shaft, a spring reacting at opposite ends against the shaft and the pin to urge said one of the locking means to inoperative position, said tool also comprising a handle movably mounted in the casing, and link means connecting the handle and the pin to move said one locking means to its operative position with respect to the complementary locking means on the casing.

6. A strap applying tool comprising a casing, a registration plate at one end of said casing for entry of the strap in the tool, a shaft axially movably mounted in the casing, means on the shaft for engaging the strap for movement thereof with the shaft to thereby tighten the strap to a predetermined tension point, a part movable with the axial movement of the shaft, means thereupon engaging the shaft and holding it against axial movement and for then rotating said strap engaging means, thereby twisting the strap, said means for arresting axial movement of the shaft and rotating the strap engaging means includes a gear plate pivoted in the casing, connections between said gear plate and the strap engaging means for rotating the strap engaging means, said tool also comprising a first pivot on the gear plate, a handle pivoted thereto, a second pivot on the handle, the part on the shaft including a shaftable pin and a locking dog carried thereby, a link connecting said second pivot and said shiftable pin, a spring reacting between the shaft and the shifting pin to yieldingly resist shifting of the pin, whereby the initial movement of the handle will cause a pivoting action about the first pivot and axial movement of the shaft until the spring is overcome, whereupon the shifting pin will move relative to the shaft to operate the locking dog and whereby the handle will then rotate about the second pivot to drive the gear plate about its pivotal connection with the casing.

7. A tool as claimed in claim 6 in which a spring retracts the gear plate.

8. A strap applying tool comprising a casing, a registration plate at one end of said casing for entry of the strap in the tool, a shaft axially movably mounted in the casing, means on the shaft for engaging the strap for movement thereof with the shaft to thereby tighten the strap to a predetermined tension point, a part movable with the axial movement of the shaft, means thereupon engaging the shaft and holding it against axial movement and for then rotating said strap engaging means, thereby twisting the strap, said strap engaging means is connected to the shaft by an elongated bar, there being a bearing on the shaft slidably engaging the bar and rotatable therewith, said shaft being made in two sections, the section of the shaft carrying the bearing being rotatable with respect to the remaining portion of the shaft.

9. A structure as set forth in claim 8 in which the remaining portion of the shaft includes the part on the shaft operable to effect holding the shaft against axial movement.

10. In a strap applying tool as set forth in claim 1, a blade member positioned at the registration end of the casing for engagement with the strap, to cut the strap on rotation of the strap engaging means.

11. In a strap applying tool as set forth in claim 10, means interconnecting the registration plate with the blade member comprising an offset pin portion on the cutter blade freely received in an aperture in the registration plate.

12. In a strap engaging tool as set forth in claim 11, shoulder means on said registration plate and a complementary shouldered portion on said blade member for registration therewith on rotation of said blade member to prevent further rotation of said blade member.

13. A strap applying tool comprising a casing, a registration plate at one end of said casing for entry of the strap in the tool, a shaft axially movably mounted in the casing, means on the shaft for engaging the strap for movement thereof with the shaft to thereby tighten the strap to a predetermined tension point, and means thereupon rotating said strap engaging means, thereby twisting the strap, said strap engaging means includes a gear plate pivoted in the casing, connections between said gear plate and the strap engaging means for rotating the strap engaging means upon movement of said gear plate, said tool also comprising a first pivot on the gear plate, a handle pivoted thereto, a second pivot on the handle displaced from said first pivot and movable with said handle, a connection between said second pivot and shaft for moving the shaft upon movement of the handle, said handle pivoting about said second pivot upon resistance being encountered to the movement of said shaft for effecting rotation of said gear.

References Cited
UNITED STATES PATENTS

| 2,150,234 | 3/1939 | McKee | 81—9.3 |
| 2,882,934 | 4/1959 | Gerrard | 140—123.6 |
| 3,118,473 | 1/1964 | Bell | 140—123.6 |
| 3,154,114 | 10/1964 | Bailey | 81—9.3 |
| 3,163,187 | 12/1964 | MacIntosh | 140—93.6 |
| 3,169,560 | 2/1965 | Caveney et al. | 140—123.6 |
| 3,173,456 | 3/1965 | Bailey | 81—9.3 |
| 3,254,680 | 6/1966 | Caveney et al. | 140—93.2 |
| 3,332,454 | 7/1967 | Lawson et al. | 140—123.6 |
| 3,344,815 | 10/1967 | Lawson et al. | 140—123.6 |

CHARLES W. LANHAM, *Primary Examiner.*

E. M. COMBS, *Assistant Examiner.*

U.S. Cl. X.R.

140—123.6